US011104443B2

United States Patent
Tauscher et al.

(10) Patent No.: US 11,104,443 B2
(45) Date of Patent: Aug. 31, 2021

(54) THREADED INSERT BASE FOR PNEUMATIC DE-ICER AIR CONNECTIONS

(71) Applicant: Goodrich Corporation, Charlotte, NC (US)

(72) Inventors: Kurt M. Tauscher, Kent, OH (US); Rick Pudoka, Uniontown, OH (US); Joseph B. Honaker, Ronceverte, WV (US)

(73) Assignee: Goodrich Corporation, Charlotte, NC (US)

( * ) Notice: Subject to any disclaimer, the term of this patent is extended or adjusted under 35 U.S.C. 154(b) by 284 days.

(21) Appl. No.: 16/360,988

(22) Filed: Mar. 21, 2019

(65) Prior Publication Data

US 2020/0298983 A1    Sep. 24, 2020

(51) Int. Cl.
*B64D 15/00* (2006.01)

(52) U.S. Cl.
CPC .................................. *B64D 15/00* (2013.01)

(58) Field of Classification Search
CPC ....... B64D 15/00; B64D 15/16; B64D 15/166
See application file for complete search history.

(56) References Cited

U.S. PATENT DOCUMENTS

| 2,440,240 | A | * | 4/1948 | Antonson | ............ | B64D 15/166 244/134 A |
| 3,604,666 | A | * | 9/1971 | Achberger | ........... | B64D 15/166 244/134 A |
| 4,361,298 | A | * | 11/1982 | Trares | .................. | B64D 15/166 244/134 A |
| 4,595,442 | A | | 6/1986 | Trares et al. | | |
| 5,393,014 | A | * | 2/1995 | Weisend, Jr. | ........ | B64D 15/166 137/625.21 |
| 8,256,467 | B1 | * | 9/2012 | Larson | .................. | F16L 55/134 138/93 |
| 2017/0283077 | A1 | | 10/2017 | Putt | | |

FOREIGN PATENT DOCUMENTS

| FR | 988286 A | 8/1951 | | |
| TW | 201233569 A | 8/2012 | | |
| TW | M559959 U | 5/2018 | | |
| WO | WO-2018017050 A1 | * | 1/2018 | ............... B60C 3/02 |
| WO | WO2018017050 A1 | | 1/2018 | |

OTHER PUBLICATIONS

Extended European Search Report for EP Application No. 19209449.8, dated Jun. 9, 2020, 10 pages.

* cited by examiner

*Primary Examiner* — Richard G Davis
(74) *Attorney, Agent, or Firm* — Kinney & Lange, P.A.

(57) ABSTRACT

An assembly for connecting an air connection fitting to a pneumatic de-icer of an aircraft includes a molded base and a machined insert. The molded base includes a flexible material and forms a sealing interface with a portion of the pneumatic de-icer. The machined insert is set into the molded base and includes a radially inward threaded surface that forms an opening extending axially through the machined insert. The radially inward threaded surface is configured to mate with a terminal end of the air connection fitting.

11 Claims, 1 Drawing Sheet

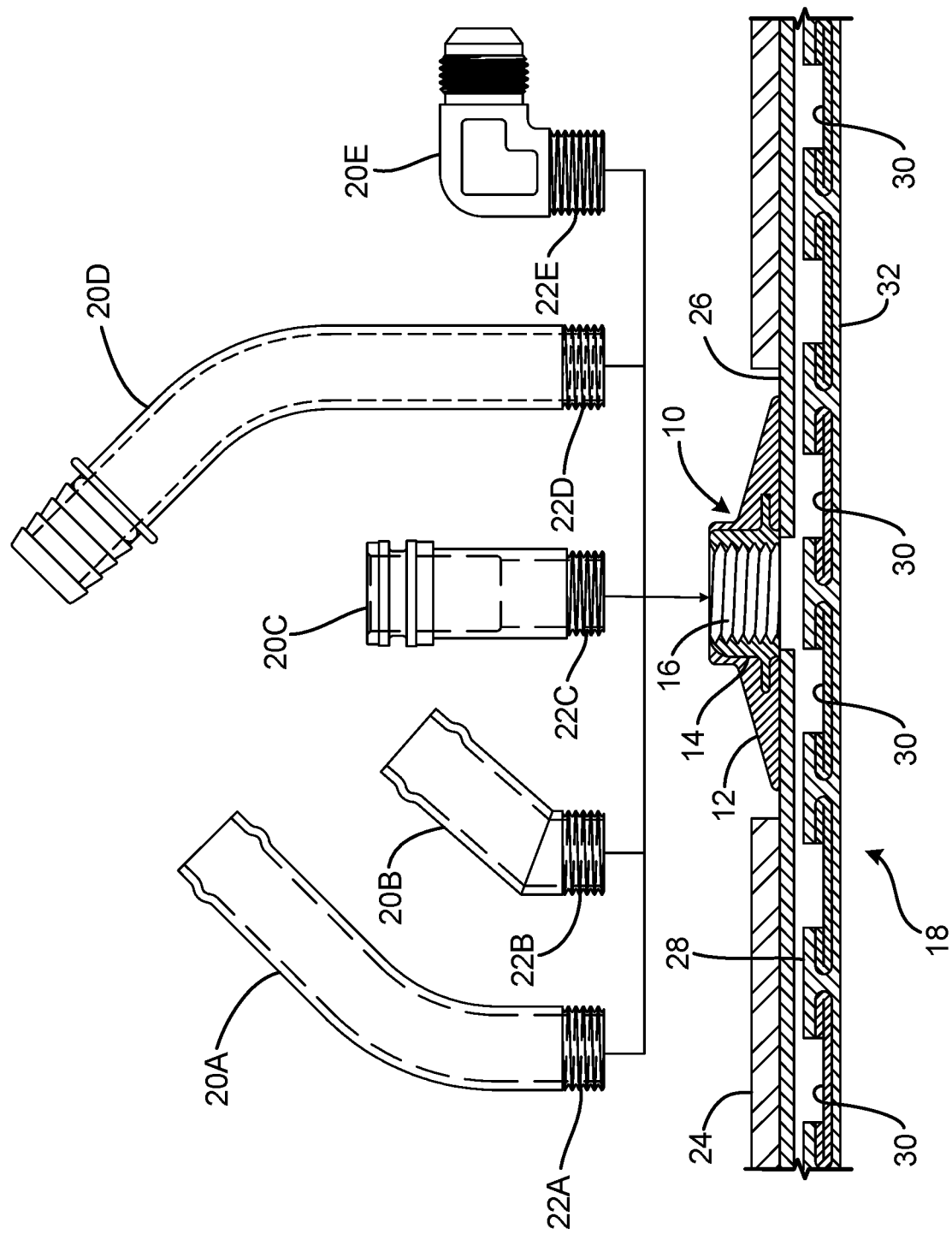

THREADED INSERT BASE FOR PNEUMATIC DE-ICER AIR CONNECTIONS

BACKGROUND

The present invention relates generally to ice protection systems, and more specifically to pneumatic de-icing systems for aircraft.

During operation, aircraft face an undesirable risk of ice accretion on forward facing components such as the leading edge of wings, horizontal stabilizers, or other airfoils. Ice that forms on airfoil components can cause drag, loss of lift, and added weight. In order to avoid such problems, it is desired to provide an ice protection system that reduces ice formation on airfoil surfaces. One such ice protection system is a pneumatic de-icer.

When an aircraft equipped with pneumatic de-icers flies into icing conditions, ice builds up along the leading edge of the wings and other similar surfaces such as engine air intakes. Whenever ice builds up to a level where the aircraft's performance could be affected, the ice is removed by briefly inflating the pneumatic de-icer tubes with pressurized air to break apart the ice, while air flowing across the wings blows the ice off. The pneumatic de-icer tubes are then pulled back down to the wing's surface by drawing a vacuum in the pneumatic de-icer tubes to minimize the aerodynamic effect on the airfoil's performance.

SUMMARY

An assembly for connecting an air connection fitting to a pneumatic de-icer of an aircraft includes a molded base and a machined insert. The molded base includes a flexible material and forms a sealing interface with a portion of the pneumatic de-icer. The machined insert is set into the molded base and includes a radially inward threaded surface that forms an opening extending axially through the machined insert. The radially inward threaded surface is configured to mate with a terminal end of the air connection fitting.

A pneumatic de-icer assembly includes a pneumatic de-icer, a base assembly, and a connection fitting. The pneumatic de-icer includes a plurality of inflatable tubes and a manifold configured to direct a pressurized fluid into and out of the inflatable tubes. The manifold is in fluid communication with the plurality of inflatable tubes. The base assembly is mounted to the pneumatic de-icer and includes a molded base and a machined insert. The molded base includes a flexible material and forms a sealing interface with a portion of the pneumatic de-icer. The machined insert is set into the molded base and includes a radially inward threaded surface that forms an opening extending axially through the machined insert. The connection fitting includes a threading disposed on a first terminal end of the connection fitting and a tube configure to transport a fluid. The terminal end of the air connection fitting is configured to mate with the radially inward threaded surface of the machined insert.

The present summary is provided only by way of example, and not limitation. Other aspects of the present disclosure will be appreciated in view of the entirety of the present disclosure, including the entire text, claims, and accompanying FIGURES.

BRIEF DESCRIPTION OF THE DRAWINGS

FIG. 1 is a side, cross sectional view of a molded base with a machined insert, the molded base shown as sealed to a pneumatic de-icer along with various air connection fittings shown in a side view.

While the above identified FIGURES set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The FIGURES may not be drawn to scale, and applications and embodiments of the present invention may include features and components not specifically shown in the drawings.

DETAILED DESCRIPTION

Pneumatic de-icer tubes are typically configured to run either "spanwise" along the wing or "chordwise" across the wing and inflate either simultaneously (all tubes at one time) or alternately (every other tube filling). Most pneumatic de-icer designs rely on a manifold to allow passage of air into the pneumatic de-icer tubes and removal of the air out of the pneumatic de-icer tubes by vacuum. Designs of such manifolds vary based on the construction of the pneumatic de-icer, but the manifolds typically connect to an air connection which attaches to a source of air pressure and vacuum of the aircraft de-icing system.

Traditional designs of air connections for pneumatic de-icers typically involve fabrication by molding rubber (synthetic or natural) onto a flared tube that has been bent or cast to a final shape. Each unique air connection shape requires a custom compression or transfer mold which can be complex depending on the tube shape. Additionally, since the rubber is being molded onto a metal tube, the tolerances on the metal tube have to be held tight so the tube flare is properly positioned within the rubber and the tube fits within the mold cavity so the part is sealed when molded. This can make construction of the tube expensive due to the precision required for the tube to fit in the mold.

As a part of a new de-icer design, engineering and the customer typically evaluate the air connection needs of the aircraft and where possible, standard stocked air connections are used. However, there are situations where stocked air connections are not available. In such situations, new molds must be developed which are can be expensive and expand the lead time for developing/constructing the de-icer. Presented herein is a common molded base including a universal threaded fitting can be attached to a fitting of any bent shape which will eliminate the need for custom molds.

FIG. 1 is a side, cross sectional view of assembly 10 (with molded base 12 and machined insert 14 with threading 16), pneumatic de-icer 18, and connection fittings 20A, 20B, 20C, 20D, and 20E (each with threading 22A, 22B, 22C, 22D, and 22E, respectively) shown in a side view. FIG. 1 additionally shows leading edge 24 and pneumatic de-icer 18, including bonding surface 26, manifold 28, tubes 30, and breeze side surface 32.

Assembly 10 includes molded base 12 and machined insert 14. Molded base 12 can be a flexible rubber base. In this example, molded base 12 includes a frusto-conical shape with a tube extending axially from the frusto-conical portion. Machined insert 14 is a tube of solid material (e.g., metal) that includes threading 16 along an inner radial surface. In this non-limiting example, the inner opening of machined insert 14 can include a diameter of ⅜ inch, ½ inch, or ⅝ inch (e.g., 0.95 centimeters, 1.27 centimeters, or 1.59 centimeters). Threadings 16, 22A, 22B, 22C, 22D, and 22E are radially extending helically shaped ridges.

Pneumatic de-icer 18 is a device used on an aircraft (not shown) for removing ice from a flight-critical aerodynamic surface of the aircraft. Connection fittings 20A, 20B, 20C, 20D, and 20E are devices for connecting components. In this example, connection fittings 20A, 20B, 20C, 20D, and 20E are hollow tubes of various shapes configured to transport a fluid (e.g., a gas such as air). In this non-limiting example, an inner diameter of machined insert 14 can include a diameter of ⅜ inch, ½ inch, or ⅝ inch (e.g., 0.95 centimeters, 1.27 centimeters, or 1.59 centimeters). Connection fitting 20A is a bent, threaded, and beaded tube with a curved portion near threading 22A. Connection fitting 20B is an investment cast tube with a bend of approximately 30°. Connection fitting 20C is a straight, machined tube. Connection fitting 20D is a bent and threaded tube with a welded barb fitting. Connection fitting 20E is a standard fitting with a 90° corner bend.

In this example, leading edge 24 can be any one of various flight-critical aerodynamic surfaces of the aircraft. In other non-limiting embodiments, leading edge 24 can be an exterior layer or surface of an aircraft evacuation slide, a life preserver, a life raft, a hazardous material suit, a chemical defense suit, or another application involving the containment of a fluid (e.g., liquid or gas). Bonding surface 26 is an inward surface of an internal layer of pneumatic de-icer 18. Manifold 28 is an air management system of pneumatic de-icer 18. Tubes 30 are air containing pockets of pneumatic de-icer 18. Breeze side surface 32 is an outer layer of pneumatic de-icer 18.

Assembly 10 is attached to and mounted within pneumatic de-icer 18. For example, a bottom surface of molded base 12 is attached to and sealed with bonding surface 26. Machined insert 14 is mounted within an axially extending center orifice of molded base 12. Threading 16 is disposed along a radially inward surface of machined insert 14. In this view, connection fittings 20A, 20B, 20C, 20D, and 20E are shown as disengaged with machined insert 14. In one non-limiting embodiment, one of connection fittings 20A, 20B, 20C, 20D, and 20E attaches to machined insert 14 by way of threadable engagement between threading 16 of machined insert 14 and threading 22A, 22B, 22C, 22D, and 22E. In this non-limiting embodiment, pneumatic de-icer 18 is mounted to a flight-critical aerodynamic surface of the aircraft. Additionally, pneumatic de-icer 18 is connected to assembly 10 via a sealed interface between a bottom surface of molded base 12 and bonding surface 26.

In this example, connection fittings 20A, 20B, 20C, 20D, and 20E are shown as disengaged from assembly 10. In other non-limiting examples, one of connection fittings 20A, 20B, 20C, 20D, and 20E connects to machined insert 14 via threadable engagement between threading 16 of machined insert 14 and one of threading 22A, 22B, 22C, 22D, and 22E of one of connection fittings 20A, 20B, 20C, 20D, and 20E, respectively. Each of threading 22A, 22B, 22C, 22D, and 22E is disposed on a terminal end of connection fittings 20A, 20B, 20C, 20D, and 20E, respectively. Leading edge 24 is connected to bonding surface 26. Bonding surface 26 is sealed with molded base 12 via adhesively bonded engagement. Manifold 28 is mounted within pneumatic de-icer 18 and is in fluid communication with tubes 30 and with a source of pressurized air (not shown) via one of connection fittings 20A, 20B, 20C, 20D, or 20E. Tubes 30 are disposed within de-icer 18 and are fluidly connected to manifold 28. Breeze side surface 32 is disposed along an external surface of manifold 28 and is exposed to ambient air that draws across the flight-critical aerodynamic surface of the aircraft.

Assembly 10 forms a detachable engagement interface between pneumatic de-icer 18 and connection fittings 20A, 20B, 20C, 20D, and 20E. Molded base 12 provides a sealing interface between bonding surface 26 of pneumatic de-icer 18 and machined insert 14 of assembly 10. Molded base 12 also holds machined insert 14 in place relative to pneumatic de-icer 18 such that machined insert 14 is held in contact and sealing engagement with bonding surface 26. Machined insert 14 receives one of connection fittings 20A, 20B, 20C, 20D, and 20E so as to attach one of connection fittings 20A, 20B, 20C, 20D, and 20E to pneumatic de-icer 18. Threading 16 engages with threading 22A, 22B, 22C, 22D, and 22E of connection fittings 20A, 20B, 20C, 20D, and 20E, respectively to detachably affix one of connection fittings 20A, 20B, 20C, 20D, and 20E to pneumatic de-icer 18.

Pneumatic de-icer 18 removes build-up of ice on the aircraft by inflating tubes 30 to contort/distort/bulge breeze side surface 32 so as to to break apart the ice. For example, upon the formation of ice chunks along breeze side surface 32, tubes 30 of pneumatic de-icer 18 are inflated to expand and break apart the ice chunks in order disengage the ice chunks from pneumatic de-icer 18 and from the aerodynamic component of the aircraft. An additional pneumatic de-icing system and functioning thereof is described in U.S. Pat. App. 2017/0283077A1 (Ser. No. 15/088,847) to Putt entitled "PNEUMATIC DE-ICER WITH SENSOR FOR SUPERCOOLED LARGE DROPLET ICING DETECTION" filed Apr. 6, 2016, which is incorporated herein by reference in its entirety.

Connection fittings 20A, 20B, 20C, 20D, and 20E fluidly connect an air supply hose (not shown) to pneumatic de-icer 18 via assembly 10. Connection fittings 20A, 20B, 20C, 20D, and 20E are used to supply pressurized air or vacuum from a pressurized air supply to manifold 28 of pneumatic de-icer 18. Threading 22A, 22B, 22C, 22D, and 22E engage with threading 16 of machined insert 14 so as to detachably affix one of connection fittings 20A, 20B, 20C, 20D, and 20E, respectively to pneumatic de-icer 18. Leading edge 24 guides a fluid medium (e.g., ambient air) across the surface of an aerodynamic element (e.g., wing, tail-fin, vertical stabilizer, engine inlet, etc.) of the aircraft. Bonding surface 26 forms a sealing interface with molded base 12 so as to prevent air from escaping pneumatic de-icer 18 between pneumatic de-icer 18 and assembly 10. Manifold 28 controls, contains, and directs a flow of air through portions of pneumatic de-icer 18 to allow air to fill and be drawn out of tubes 30. Tubes 30 inflate and deflate with air causing breeze side surface 32 to bulge or flatten, respectively in order to break apart ice that has formed on pneumatic de-icer 18. Tubes 30 are shown in a deflated state in FIG. 1.

Assembly 10 with molded base 12 and machined insert 14 alleviates the need for expensive custom molds by using a standard configuration molded base 12 with machined insert 14 that attaches to a fitting or tube of any bent shape or geometry which can be specifically designed to fit a customer's needs Eliminating the need for expensive custom molds reduces tooling costs because a common, uniform mold (i.e., molded base 12) will be used instead of unique molds that require new and custom tooling for every build. Other benefits of assembly 10 with molded base 12 and machined insert 14 include a reduction in product development time because new air connection molds won't be required for every new application.

In addition, de-icer air connections often must be routed through hard to reach sections of the aircraft. Without being limited by a mold, the bent shapes of the fitting's tube geometry (e.g., geometries of connection fittings 20A, 20B, 20C, 20D, and 20E) can be designed to simplify installation of pneumatic de-icer 18 with any one of connection fittings 20A, 20B, 20C, 20D, and 20E. Moreover, assembly 10 no longer needs to fit within a mold cavity thereby allowing production tolerances of manufacturing of connection fittings 20A, 20B, 20C, 20D, and 20E to be loosened which will reduce a production cost (e.g., time and money) of connection fittings 20A, 20B, 20C, 20D, and 20E. Likewise, molded base 12 allows for the flexibility of using a large multi-cavity mold that can be designed thereby reducing piece part costs of assembly 10 and pneumatic de-icer 18.

Discussion of Possible Embodiments

An assembly for connecting an air connection fitting to a pneumatic de-icer of an aircraft includes a molded base and a machined insert. The molded base includes a flexible material and forms a sealing interface with a portion of the pneumatic de-icer. The machined insert is set into the molded base and includes a radially inward threaded surface that forms an opening extending axially through the machined insert. The radially inward threaded surface is configured to mate with a terminal end of the air connection fitting.

The assembly of the preceding paragraph can optionally include, additionally and/or alternatively, any one or more of the following features, configurations and/or additional components.

The molded base can comprise a rubber material.

A pneumatic de-icer assembly includes a pneumatic de-icer, a base assembly, and a connection fitting. The pneumatic de-icer includes a plurality of inflatable tubes and a manifold configured to direct a pressurized fluid into and out of the inflatable tubes. The manifold is in fluid communication with the plurality of inflatable tubes. The base assembly is mounted to the pneumatic de-icer and includes a molded base and a machined insert. The molded base includes a flexible material and forms a sealing interface with a portion of the pneumatic de-icer. The machined insert is set into the molded base and includes a radially inward threaded surface that forms an opening extending axially through the machined insert. The connection fitting includes a threading disposed on a first terminal end of the connection fitting and a tube configure to transport a fluid. The terminal end of the air connection fitting is configured to mate with the radially inward threaded surface of the machined insert.

The assembly of the preceding paragraph can optionally include, additionally and/or alternatively, any one or more of the following features, configurations and/or additional components.

The connection fitting can engage with the threaded insert such that the connection fitting can be detachably affixed to the pneumatic de-icer.

The molded base can hold the machined insert in place relative to the pneumatic de-icer.

The pneumatic de-icer further can comprise a bonding surface that can be sealed with and/or bonded to a portion of the molded base of the base assembly.

The molded base can hold the machined insert in contact and/or in sealing engagement with the bonding surface of the pneumatic de-icer.

The connection fitting can comprise a bent, threaded, and/or beaded tube with a curved portion.

The connection fitting can comprise an investment cast tube.

The connection fitting can comprise a machined tube that is straight.

The connection fitting can comprise is a bent and threaded tube with a welded barb fitting.

The connection fitting can comprise a 90° corner bend.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for connecting an air connection fitting to a pneumatic de-icer of an aircraft, the assembly comprising:
    a molded base comprising a flexible material, wherein the molded base is configured to form a sealing interface with a bonding surface of the pneumatic de-icer, wherein the bonding surface is an inward surface of the pneumatic de-icer and is opposite an external breeze side surface of the pneumatic de-icer; and
    a machined insert set into the molded base, wherein:
        the machined insert includes a radially inward threaded surface that forms an opening extending axially through the machined insert, a first axial surface, and a second axial surface opposite the first axial surface;
        the radially inward threaded surface is configured to mate with a terminal end of the air connection fitting;
        the molded base holds the first axial surface of the machined insert in contact and in sealing engagement with the bonding surface of the pneumatic de-icer; and
        the second axial surface of the machined insert extends away from the bonding surface in a direction opposite the external breeze side surface.

2. The assembly of claim 1, wherein the molded base comprises a rubber material.

3. A pneumatic de-icer assembly comprising:
    a pneumatic de-icer comprising:
        a plurality of inflatable tubes;
        a manifold configured to direct a pressurized fluid into and out of the inflatable tubes, wherein the manifold is in fluid communication with the plurality of inflatable tubes;
        a bonding surface, wherein the bonding surface is an inward surface of the pneumatic de-icer; and
        a breeze side surface, wherein the breeze side surface is an outer surface of the pneumatic de-icer;
    a base assembly mounted to the pneumatic de-icer and comprising:
        a molded base comprising a flexible material, wherein the molded base forms a sealing interface with the bonding surface of the pneumatic de-icer; and
        a machined insert set into the molded base, wherein:
            the machined insert includes a radially inward threaded surface that forms an opening extending axially through the machined insert, a first axial surface, and a second axial surface opposite the first axial surface;
            the molded base holds the first axial surface of the machined insert in contact and in sealing engagement with the bonding surface of the pneumatic de-icer; and the second axial surface of the machined insert extends away from the bonding surface in a direction opposite the external breeze side surface; and a connection fitting with a threading disposed on a first terminal end of the connection fitting, wherein the connection fitting includes a tube configure to transport a fluid, wherein the terminal end of the air connection fitting is configured to mate with the radially inward threaded surface of the machined insert.

4. The pneumatic de-icer assembly of claim 3, wherein the connection fitting engages with the threaded insert such that the connection fitting is detachably affixed to the pneumatic de-icer.

5. The pneumatic de-icer assembly of claim 3, wherein the molded base holds the machined insert in place relative to the pneumatic de-icer.

6. The pneumatic de-icer assembly of claim 3, wherein the pneumatic de-icer further comprises a bonding surface that is sealed with and bonded to a portion of the molded base of the base assembly.

7. The pneumatic de-icer assembly of claim 3, wherein the connection fitting comprises a bent, threaded, and beaded tube with a curved portion.

8. The pneumatic de-icer assembly of claim 3, wherein the connection fitting comprises an investment cast tube.

9. The pneumatic de-icer assembly of claim 3, wherein the connection fitting comprises a machined tube that is straight.

10. The pneumatic de-icer assembly of claim 3, wherein the connection fitting comprises is a bent and threaded tube with a welded barb fitting.

11. The pneumatic de-icer assembly of claim 3, wherein the connection fitting comprises a 90° corner bend.

\* \* \* \* \*